United States Patent
Christiaens

(10) Patent No.: US 11,957,091 B2
(45) Date of Patent: *Apr. 16, 2024

(54) CULTIVATION ARRANGEMENT AND METHOD

(71) Applicant: Christiaens Group B.V., Horst (NL)

(72) Inventor: Martinus Leonardus Hendrikus Maria Christiaens, Swolgen (NL)

(73) Assignee: CHRISTIAENS GROUP B.V., Horst (NL)

(*) Notice: Subject to any disclaimer, the term of this patent is extended or adjusted under 35 U.S.C. 154(b) by 370 days.

This patent is subject to a terminal disclaimer.

(21) Appl. No.: 17/508,467

(22) Filed: Oct. 22, 2021

(65) Prior Publication Data

US 2022/0039328 A1 Feb. 10, 2022

Related U.S. Application Data

(63) Continuation-in-part of application No. 16/304,551, filed as application No. PCT/NL2017/050339 on May 26, 2017, now Pat. No. 11,185,027.

(30) Foreign Application Priority Data

May 27, 2016 (NL) ..................................... 2016850

(51) Int. Cl.
*A01G 31/06* (2006.01)
*A01G 9/02* (2018.01)
*A01G 18/00* (2018.01)

(52) U.S. Cl.
CPC ............. *A01G 9/023* (2013.01); *A01G 18/00* (2018.02)

(58) Field of Classification Search
CPC ........ A01G 18/62; A01G 18/70; A01G 18/60; A01G 9/143; A01G 31/06; A01G 31/045
See application file for complete search history.

(56) References Cited

U.S. PATENT DOCUMENTS 3,717,953 A 2/1973 Kuhn et al.
4,901,471 A 2/1990 Van Den Top
(Continued)

FOREIGN PATENT DOCUMENTS

DE 102011011411 A1 8/2012
EP 0292075 A1 11/1988
(Continued)

OTHER PUBLICATIONS

Extended European Search Report dated Feb. 6, 2020. issued in EP Application No. 19209083.5 (9 pgs.).
(Continued)

*Primary Examiner* — Monica L Perry
(74) *Attorney, Agent, or Firm* — Pillsbury Winthrop Shaw Pittman, LLP

(57) ABSTRACT

The invention relates to a cultivation arrangement. A first and a second rack are arranged adjacent and aligned with each other, providing a working space therebetween. Each rack comprises support structures arranged at support heights for supporting cultivation packages at a plurality of heights. The support heights are aligned with each other. The support structures comprises one or more guiding members and the arrangement comprises moving means arranged for moving packages from the first to the second rack or back, via the working space. Cultivation packages can be supported such that at most a single package is supported at each of the aligned support heights. This enables the packages to be alternatingly supported in either the first or the second rack across the support heights. The arrangement further includes an operator platform contiguous to the working space which is moveable in a vertical direction to enable working at different heights.

18 Claims, 6 Drawing Sheets

(56) References Cited

U.S. PATENT DOCUMENTS

| | | |
|---|---|---|
| 6,018,906 A | 2/2000 | Pia et al. |
| 9,901,045 B2 | 2/2018 | Miyabe |
| 10,772,262 B2 | 9/2020 | Amminger |
| 2013/0340329 A1 | 12/2013 | Van Den Top |
| 2014/0017043 A1 | 1/2014 | Hirai |
| 2014/0366443 A1 | 12/2014 | Brusatore |
| 2016/0236865 A1 | 8/2016 | Altemir |
| 2018/0168110 A1 | 6/2018 | Amminger |
| 2020/0236883 A1 | 7/2020 | Ambrosi |

FOREIGN PATENT DOCUMENTS

| | | |
|---|---|---|
| EP | 0324607 A1 | 7/1989 |
| EP | 1064836 A2 | 1/2001 |
| EP | 1123649 A1 | 8/2001 |
| EP | 1527675 A1 | 4/2005 |
| EP | 1527675 A1 | 5/2005 |
| EP | 1637033 A1 | 3/2006 |
| NL | 8003088 A | 1/1982 |
| NL | 8700775 A | 11/1988 |
| NL | 9001797 A | 3/1992 |
| NL | 9301347 A | 3/1995 |
| NL | 194489 B | 2/2002 |
| NL | 1023008 C2 | 9/2004 |
| NL | 2014713 A | 10/2016 |
| WO | 91/11902 A1 | 8/1991 |
| WO | 2005/048689 A1 | 6/2005 |
| WO | 2010/056036 A2 | 5/2010 |
| WO | 2014/066844 A2 | 5/2014 |

OTHER PUBLICATIONS

International Preliminary Report on Patentability dated Nov. 27, 2018, issued in International Patent Application No. PCT/NL2017/050339 (8 pgs.).

International Search Report dated Sep. 9, 2018, issued in International Patent Application No. PCT/NL2017/050339.

Notice of Allowance dated Jun. 15, 2022, issued in corresponding U.S. Appl. No. 16/692,404 (12 pgs.).

CULTIVATION ARRANGEMENT AND METHOD

CROSS-REFERENCE TO RELATED APPLICATIONS

This application is a Continuation-In-Part of U.S. Ser. No. 16/304,551, filed Nov. 26, 2018, which is the U.S. National Stage of PCT/NL2017/050339, filed May 26, 2017, which in turn claims priority to Netherlands Application No. 2016850, filed May 27, 2016, the contents of each of these applications being incorporated herein by reference in their entireties.

FIELD OF THE INVENTION

The present invention is directed at a cultivation arrangement, e.g. an arrangement for the cultivation of horticultural products, wherein the products are cultivated in cultivation beds arranged in racks at various support heights. The invention is further directed at a method for cultivation of such horticultural products.

BACKGROUND

The cultivation of mushrooms, such as champignons or similar products, is typically on a large scale performed in in-house in cultivation facilities. Cultivation conditions are to be monitored and managed well in such facilities, because the growing of mushrooms is very sensible to deviations from these conditions. Moreover, controlling these conditions also enables to control the yield and size of the champignons bred. To guarantee the breeding of high quality products, active and accurate management the cultivation conditions is thus important.

As may be understood, it is more easy to manage these conditions in small or compact cultivation facilities. The larger a facility becomes, the more difficult it will be to manage the conditions efficiently everywhere in the facility. For this reason, it is advantageous not to make the facilities too large and to use the available space efficient. For this reason, mushrooms such as champignons are typically bred in racks, having cultivation beds arranged in a stacked configuration at various heights, as this allows efficient use of the available space. As will be appreciated, the space above each bed large enough to allow growth, condition management and harvestings. With respect to the latter, an operator harvesting mushrooms must be able to reach the mushrooms in the beds and to judge their size in order to pick the right mushrooms to harvest.

With respect to the cultivation conditions, a further challenge is provided by the optimal conditions during various stages of cultivation. For example for champignons, after spawning during the phase wherein the casing soil is being colonized by mycelium by ingrowth, the soil is to be kept wet and the ambient conditions require a high content of carbon dioxide ($CO_2$) and a relative high temperature of 22 to 23 degrees Celcius (° C.). However, in the phase thereafter when the casing soil is colonized, the mycelium will form buttons at the surface. During this stage, ventilation is important, the $CO_2$ is reduced and the temperature will be decreased to 17 to 18° C. Thereafter, control of the ambient conditions allows to manage whether many small champignons (e.g. at low temperatures and low humidity) or fewer large champignons (e.g. at higher temperatures and higher humidity) will grow. Ventilation remains important during this phase, which will continue until the mushrooms are ready for harvesting.

During the harvesting phase, having a duration of various weeks, the mushrooms appear and grow in cycles. Also, various different sizes may be desired, requiring to perform harvesting of some mushrooms to take place later than other mushrooms. Thus harvesting may be performed multiple times per cultivation bed. Due to the vulnerability of the mushrooms, machined harvesting—although being much faster—has the disadvantage of leading to more damage and lesions on the mushrooms. Therefore manual harvesting is still popular, however, this is a labour intensive task. During such harvesting, reaching the mushrooms as well as judging their size is difficult in view of the typically limited amount of space above the beds. Hence, this may lead to variation in size of the mushrooms harvested and it also renders the task to be physically demanding on the operator/harvester.

SUMMARY OF THE INVENTION

In the present document, reference is made to a 'cultivation package'. This term is to be understood as a package comprising at least compost including the horticultural products or it's growth, spores or seeds (i.e. spores, ingrown spores, seeds, seedlings of the horticultural products). Usually, but dependent on the type of product, the cultivation package may also comprise further layers or ingredients, e.g. casing soil for champignons.

It is an object of the present invention to ameliorate the disadvantages identified above, and to provide a cultivation arrangement and method that allows efficient use of space for enabling effective condition management, while also improving harvesting conditions.

To this end, there is provided herewith a cultivation arrangement, comprising a first and a second rack arranged adjacent and aligned with each other such as to provide a working space between the first and the second rack, wherein each rack comprises a plurality of support structures arranged at respective support heights for supporting cultivation packages at a plurality of heights in each rack, and such that the support heights of the first and the second rack are aligned with each other, wherein each support structure comprises one or more guiding members for guiding a cultivation package along a horizontal movement, the arrangement further comprises moving means arranged for cooperating with the cultivation packages, for moving of the packages from the first to the second rack or from the second to the first rack via the working space; wherein the arrangement is arranged for receiving or supporting a plurality of said cultivation packages, such that at most a single cultivation package is supported at each of the aligned support heights in the arrangement, for enabling the packages to be alternatingly supported in either the first or the second rack across the aligned support heights; further comprising an operator platform arranged contiguous to the working space on at least one side thereof, the platform being moveable in a vertical direction to enable working by the operator at the support heights.

The invention enables the packages to be moved from the first to the second rack, or vice versa, past the platform. While the packages are moved past the platform, the operator has all the space he desires above the package to perform the harvesting in a manner that is physically less demanding. Moreover, because the operator can bend over the package, the size of the mushrooms in the package can be judged much better as compared to the situation wherein mushrooms are to be harvested directly from the packages in the racks. In conventional harvesting methods of this type, the size must be judged by the operator by observing the mushrooms from aside while the package is relatively dark in view of the arrangement of the rack with stacked packages. In the present invention, the packages move past the platform while being well illuminated, providing the desired working and movement space to perform the task.

In addition to this, by enabling the cultivation packages to be distributed in an alternating arrangement amongst the first and second rack, better ventilation and ambient climate control may be achieved above the cultivation packages in this stage of the growing process. In particular, the alternating arrangement doubles the height available above the cultivation packages while these are residing in the first and second rack. At the same time, a much more compact stacking of the cultivation packages would be achieved in case all cultivation packages would reside in one rack. This situation may for example be achieved in the phase between spawning and prior to the harvesting phase, by keeping the cultivation packages in one rack as will be explained later. In connection herewith, it is also worthwhile to mention that during the later stages of the process, when the cultivation packages reside in the first and second rack, it is already beneficial to the cultivation process to refresh the air directly ambient to the horticultural products. This may for example be achieved simply by moving the cultivation packages to the other rack or backwards, causing the air ambient to the products to be refreshed instantaneously due to the displacement.

In accordance with some embodiments, in the arrangement, each cultivation package is supported in a carriage cooperating with the guiding members. In accordance with some embodiments, the arrangement comprises a single carriage at each support height, which carriage is moveable between the first and the second rack. For example, the guiding members may be guiding rails and wheels that are connected to the carriage in a rotatable manner, may cooperate with the rails to enable smooth movement in one desired direction back and forth. By providing that only a single carriage is present at each height of the aligned heights of the first and second rack, each carriage may selectively be moved to either of the first and second rack (e.g. in an alternating arrangement, or all in one rack, or otherwise).

Moving of the carriage from one rack to another rack may be provided for manually—i.e. by pulling the carriage out of the support structure via the rails and into the opposing support structure of the other rack. Alternatively, the moving of the carriages may be actuator driven, e.g. by using a motor performing this task. The carriage could itself be equipped with a motor, but alternatively a common or central motor may be present in the arrangement that may be shared amongst the carriages present.

For example, in accordance with some embodiments, the moving means comprise an actuator comprising an engagement member arranged for engaging with one or more of the carriages for moving of the carriage by the actuator from the first to the second rack or from the second to the first rack. In accordance with some embodiments, the actuator is mounted in the arrangement to be vertically moveable relative to the first and second rack such as to enable the engagement member, dependent on a current vertical position of the engagement member, to engage with a carriage at a respective support height. The actuator may for example be installed to be moveable with the platform (e.g. the actuator may be mounted on the moveable structure described further down below). Alternatively, a plurality of actuators may be mounted on each rack, e.g. one or more actuators at each support height for moving the carriages at that support height. Various different kind of engagement solutions may be applied, as will be recognized by the skilled reader. Therefore, the invention is not limited to a particular type of engagement member.

In accordance with some embodiments, the actuator comprises one or more controls for setting a movement speed for moving the respective carriage. As will be appreciated, this allows the working conditions for accurate and efficient harvesting to be manageable. The controls may further comprise controls for moving the platform in a vertical direction to set the desired height. In accordance with embodiments, the operator platform is connected to a moveable structure cooperating with vertical guiding members arranged on one or more of the first and second rack, for enabling the vertical movement of the platform. Moreover, in accordance with some embodiments, the moveable structure comprises a first and a second operator platform being arranged on either side of the working space. As may be appreciated, this enables to work on the cultivation packages from two different sides of the package, to achieve doubled efficiency.

The moveable structure, apart for supporting the platform and the means for vertical movement, may be further equipped and utilized for performing all kinds of additional functions during or in addition to harvesting. For example, watering means or fertilizing means may be present for nurturing or wetting, or a light source for lighting the work space. Therefore, in accordance with some embodiments, the moveable structure of the arrangement further comprises, connected thereto, at least one of a group comprising: a nurturing or wetting arrangement, such as a liquid nozzle, a powder nozzle, a granulate distributer, a sprayer, a drip irrigation device, or a fertilizer distributer; a harvesting apparatus; a selective mushroom eradicator, such as a directable beam, a needle or a gripper for selectively eradicating mushrooms; a camera; a light source; one or more sensors, such as a temperature sensor or a humidity sensor.

As already briefly mentioned above, after spawning and before harvesting, the cultivation packages may reside in one single rack wherein a package is present e.g. at each defined height in the rack. This provides a compact stacking of the packages. This is advantageous for example for the cultivation of mushrooms such as champignons during this phase. The packages do not need to be very accessible during this phase, and a compact stacking allows reduces the required space for keeping the racks under the right conditions. In accordance with some embodiments, the arrangement therefore further comprises a third rack arranged adjacent and aligned with the first rack, the third rack comprising a plurality of further support structures arranged at respective support heights for supporting cultivation packages at the plurality of heights in the third rack, and such that the support heights of the third rack are aligned with the support heights of the first rack, the arrangement further comprising a transfer unit for moving cultivation packages from the third rack into the first rack. The third rack may be a separate rack that may be kept in a separate room during growth, i.e. isolating it for different ambient condition control for the third rack. In such an embodiment, when the packages with the horticultural products (e.g. champignons) are ready to be moved to the first rack, the transfer unit may be connected to each of the cultivation packages, and the packages may be hauled into the first rack. The manner in which this is done depends of the transfer unit applied. For example, the cultivation packages may already be supported in carriages in the third rack, or alternatively the packages may be differently supported (e.g. on a cloth or canvas or on a plate-like construction) and pulled into a carriage of the first rack. Also the packages may be pulled into the first rack either one-by-one, two or more together, or all at once. In some embodiments, for providing the transfer unit, one or more of the support structures of the first rack each comprise a pulley comprising a windable longitudinal pulling member and a coupling member connected to the pulling member, the pulling member having a length for enabling spanning the first rack in longitudinal direction such as to enable coupling of the coupling member to a cultivation package in the third rack, the pulley being operable for pulling the cultivation package into the support structure of the first rack. This may include a winch or rollable spool or the like.

In some embodiments, the support structures are configured for supporting cultivation packages comprising horticultural products, wherein the horticultural products include at least one of a group comprising: mushrooms, such as champignons; fruits; berries; nuts; vegetables; flowers; herbs; spices; or other crops. The cultivation arrangement of the present invention may advantageously be for the cultivation of a large range of horticultural products, in particular horticultural products growing from small crops.

In accordance with a second aspect, the invention is directed at a method of cultivating horticultural products, more specifically mushrooms, using an arrangement comprising a first and a second rack arranged adjacent and aligned with each other, and each rack comprising a plurality of support structures for supporting cultivation packages at a plurality of support heights, the support heights provided by the first and second rack being aligned with each other at a same level, the method comprising: supporting a plurality of cultivation packages in the first and the second rack, such that at most a single cultivation package is supported in either the first or the second rack at each aligned support height, and such that the packages are alternatingly supported in either the first or the second rack across the aligned support heights; vertically moving an operator platform near a working space defined between the first and the second rack to enable an operator on the platform work at a selected support height; moving, using a moving means, a respective cultivation package from the first to second rack or from the second to the first rack at the selected height and treating or handling of the horticultural products during said moving of the respective cultivation package. The method may apply, for example, an arrangement in accordance with the first aspect of the invention. In accordance with some embodiments, the treating or handling includes at least one of a group comprising: harvesting the horticultural products, verifying the cultivation of the horticultural products, removing or eradicating damaged or diseased products, removing or eradicating products growing faster or maturing earlier than planned, monitoring cultivation conditions, nurturing or fertilizing the horticultural products, or size inspection of the horticultural products. The skilled person will appreciate that other operations may be performed as well, and that the invention is not limited to these particular embodiments.

In accordance with some embodiments, the method further comprises the steps of: cultivating, for a first duration of time, the horticultural products in cultivation packages in a third rack comprising a plurality of further support structures arranged at respective support heights, wherein the support heights of the third rack are aligned with the support heights of the first rack; aligning the third rack with the first rack; and moving, using a transfer unit, the cultivation packages from the third rack into the first rack, for enabling cultivation of the horticultural products in either one of the first and the second rack for a second duration of time. As explained, in the third rack, the stacking may be more compact as access to the packages is not frequently required and a more compact stacking takes less space of which the ambient conditions need to be controlled.

In accordance with some embodiments, the step of cultivating the horticultural products in the third rack is performed following a step of spawning of the products in the cultivation packages. Moreover, in some embodiments, upon moving of the cultivation packages from the third rack into the first rack, at least one of the cultivation packages is moved by the moving means from the first to second rack, such as to establish the cultivation packages to be alternatingly supported in either the first or the second rack across the aligned support heights.

The cultivation method may be applied in order to cultivate a large range of horticultural products. For example the horticultural products may include at least one of a group comprising: mushrooms, such as champignons; fruits; berries; nuts; vegetables; flowers; herbs; spices; or other crops. The cultivation arrangement of the present invention may advantageously be for the cultivation of a large range of horticultural products, in particular horticultural products growing from small crops.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

In the present document, reference is made to a 'cultivation package'. This term is to be understood as a package comprising at least compost including the horticultural products or it's growth, spores or seeds (i.e. spores, ingrown spores, seeds, seedlings of the horticultural products). Usually, but dependent on the type of product, the cultivation package may also comprise further layers or ingredients, e.g. casing soil for champignons.

Figure 1:
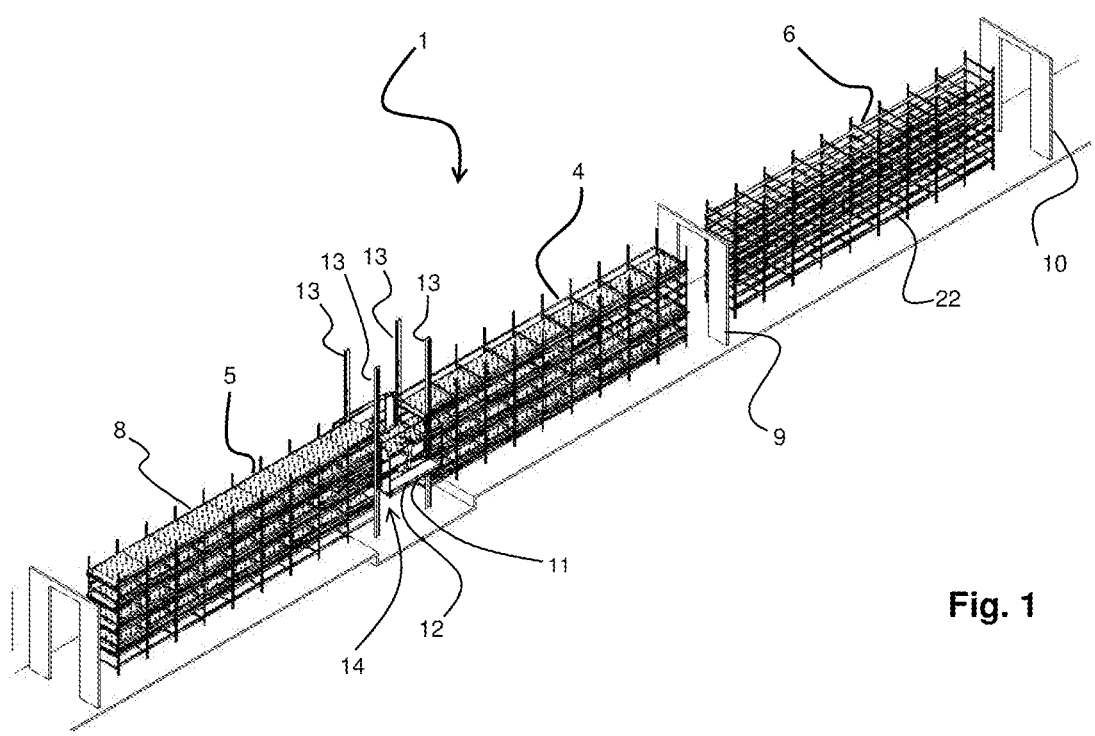
FIG. 1 illustrates an arrangement in accordance with the present invention.

FIG. 1 illustrates an arrangement, generally indicated with reference numeral 1, in accordance with the present invention. The arrangement 1 comprises a first rack 4, a second rack 5 and a third rack 6. The third rack 6 is isolated from the first and the second rack, and located in a separate room as is indicated by the walls 9 and 10 in FIG. 1.

In accordance with the present invention, in between the first rack 4 and the second rack 5, a working space 14 is formed wherein an operator platform 12 can be vertically moved up and down via guiding rails 13. The operator platform 12 allows for operators 15 (e.g. see FIG. 2D) to be moved in vertical direction alongside the working space 14 to work at various heights as desired. In the racks 4, 5 and 6, cultivation packages 8 comprising horticultural products such as mushrooms (e.g. champignons) can be arranged at various support heights in the racks. In each of the racks 4, 5, and 6, the support heights wherein the cultivation packages may be supported are the same, such that the support heights of the first rack 4 and the second rack 5 are the same, such that they are aligned with each other. Similarly, the support heights of the first rack 4 and the third rack 6 are also the same for enabling the operation of the arrangement. As may be appreciated by the skilled person, the alignment of the support heights must be such that cultivation packages 8 may be moved easily from one rack to the other. So, as can be understood, the support heights are more or less the same, but tolerances or workable differences that readily enter the mind of the skilled person are of course possible.

Figure 4:
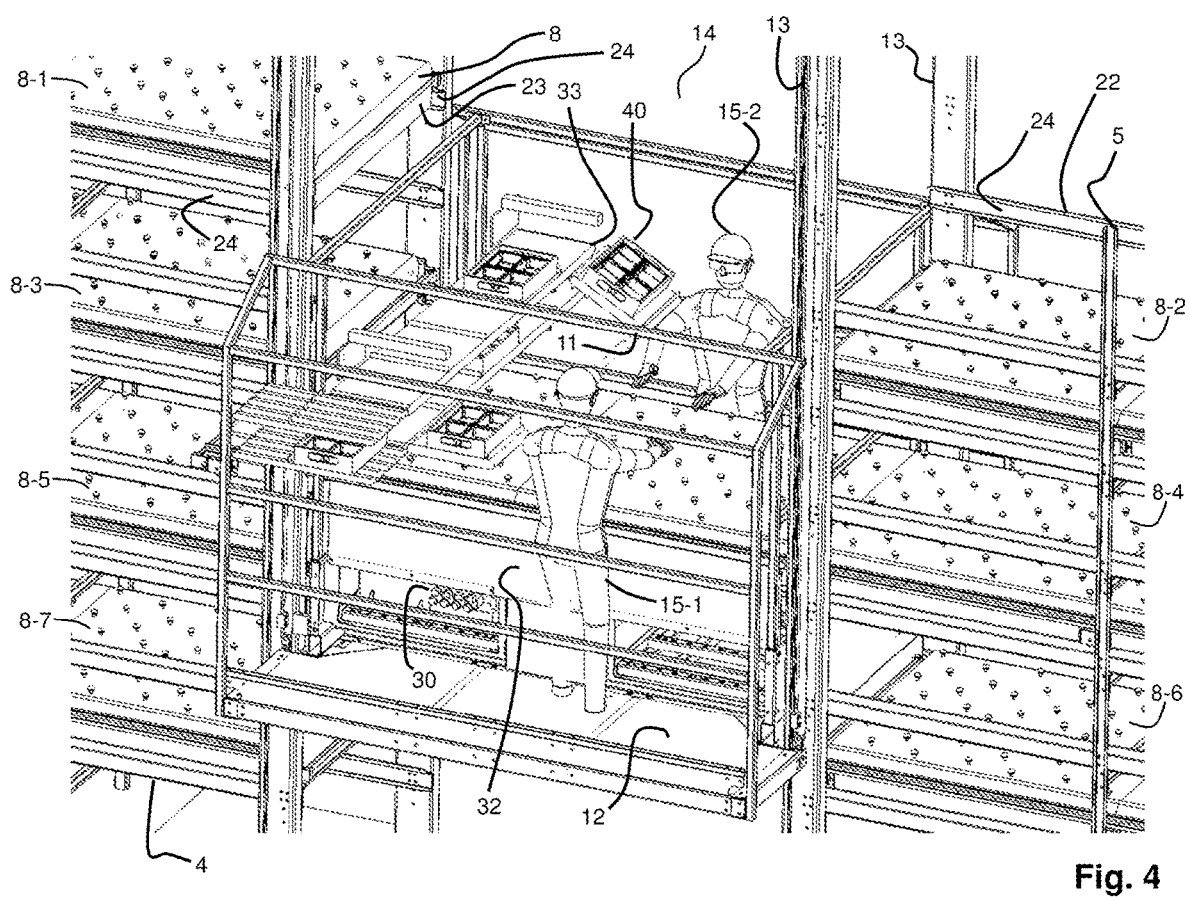
FIG. 4 illustrates a further close-up of the operator platform in an arrangement of the present invention.

For vertical movement along the rails 13 connected to the racks 4 and 5, the operator platform 12 is supported or connected to a moveable structure 11 that cooperates with the guiding rails 13. The moveable structure 11 is also shown in FIG. 4 and will be discussed further below.

Figure 2A:
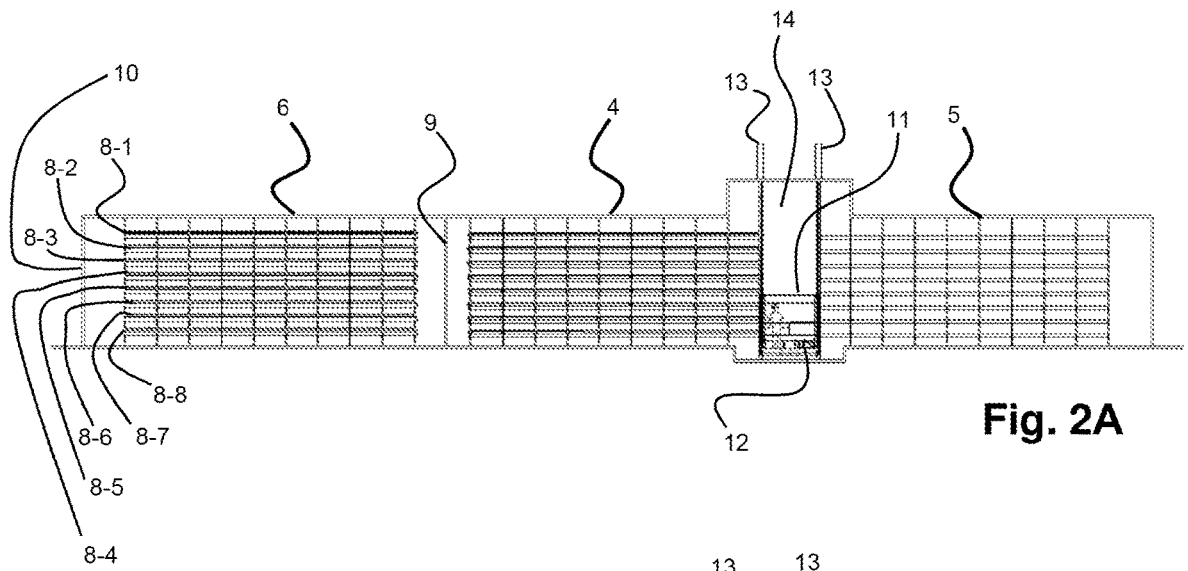
FIGS. 2A-2F illustrates a method of the present invention performs using an arrangement of the present invention.
Figure 2B:
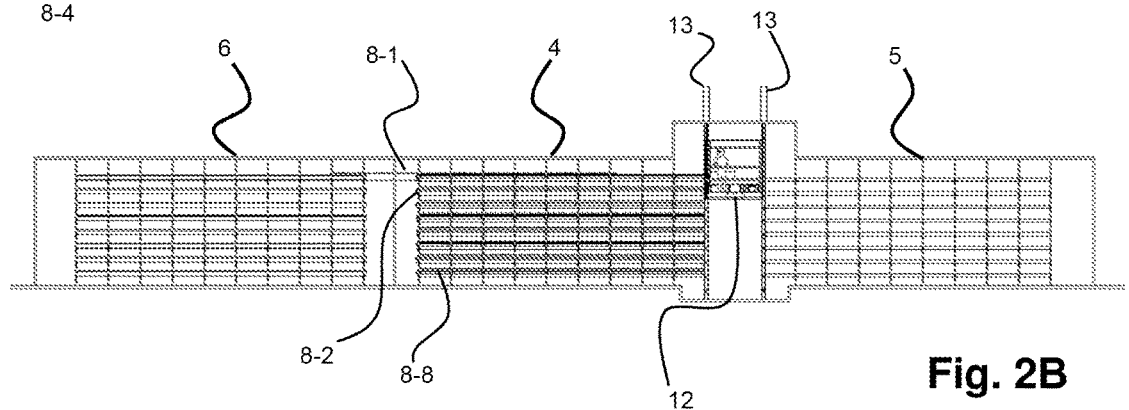
Figure 2C:
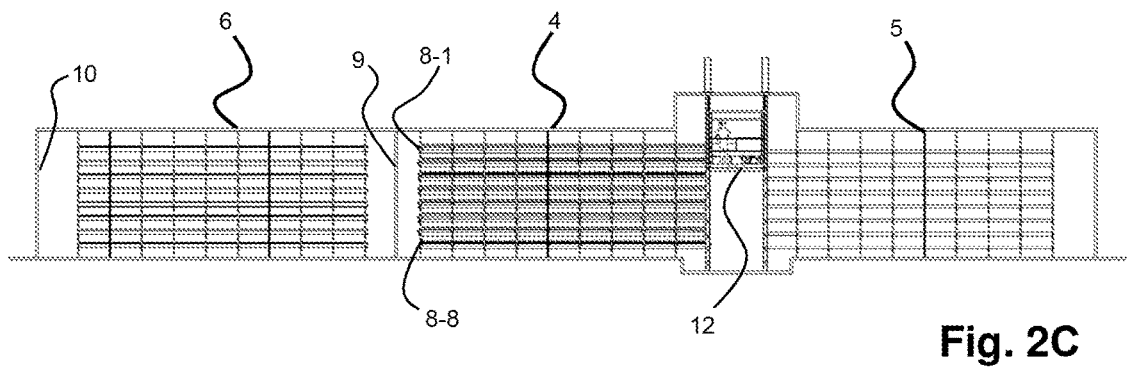
Figure 2D:
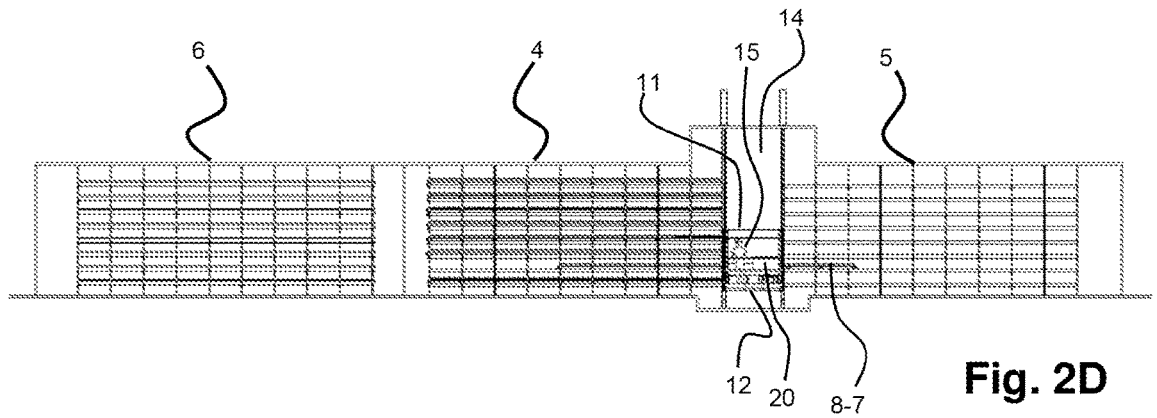

FIGS. 2A-2F illustrate a method of the present invention wherein the arrangement of the present invention is applied. In FIG. 2A, a plurality of cultivation packages 8-1 to 8-8 are supported at various support heights in the third rack 6. In this rack, the cultivation packages 8-1 to 8-8 are placed after spawning of the mushrooms. In the third rack 6, the cultivation packages 8-1 to 8-8 will reside during the first stage of the growing process. Walls 9 and 10 (see FIG. 2C) separate the third rack 6 from the first rack 4 and the second rack 5. As is visible in FIG. 1, an opening in the walls 9 and 10 will allow for the cultivation packages 8 to be moved from one rack to the other. This opening in the walls 9 and 10 may be closable by a door of any kind. By separating the third rack 6 from the first rack 4 and second rack 5, the growing conditions in the room can be controlled separately for providing the optimal conditions during this phase of the cultivation process. In FIG. 2B, each of the cultivation packages 8-1 to 8-8 is moved onto the first rack 4. As is visible in FIG. 2B, racks 8-2 to 8-8 are already moved to the first rack 4, while cultivation package 8-1 is being moved from the third rack 6 to the first rack 4 (note that not all cultivation packages have been numbered). As can be seen in FIG. 2B, the operator platform 12 has moved to the top most support height in the first rack 4 to operate a transfer unit, e.g. a hauling engine, for hauling the cultivation package 8-1 into the first rack 4. The transfer unit could be a actuator, such as an engine of any type, or may be a manually operated tool. The transfer unit for example may be a manual or power driven winch, enabling to connect a cable that is long enough to span the longitudinal distance of the first rack 4 and connect with a coupling member to a cultivation package 8 in the third rack 6.

In FIG. 2C, all of the cultivation packages 8-1 to 8-8 have been placed in a first rack 4 of the arrangement of the present invention. The third rack 6 is now empty. During the later phases of the growth process, the space between the cultivation packages 8-1 to 8-8 may be selectively increased for enabling better ventilation of the cultivation packages. To this end, the cultivation packages will be distributed amongst the first and second rack in an alternating manner, alternatingly filling the support heights of the first rack 4 and the second rack 5. This is for example shown in FIGS. 2D to 2F. The platform 12 comprising the operators 15 may be moved to the support height of cultivation package 8-7 (second from below). Here, the cultivation package 8-7, which is supported in a carriage (23) residing in support elements 22 of the racks, is moved from the first rack 4 to the second rack 5. During movement of the cultivation package 8-7, all kinds of desired operations may be performed. For example, wetting of the cultivation packages or fertilizing may be performed while moving the cultivation package 8-7 through the working area 14. To this end, the support structure 11 may for example comprise a spray nozzle or fertilizer distributor suspended above the passing package 8-7. Such equipment may be suspended from suspension construction 20 (e.g. see also FIG. 3) on the moveable structure 11. The suspension structure 20 may also, optionally, comprise cameras, light sources, sensors and all kinds of desired tools, sensors and other arrangements for performing necessary operations. The advantage of this construction is that by moving the packages (e.g. cultivation package 8-7) from the first rack 4 to the second rack 5 through the working area 14, these packages move past the available tools in the working area 14 to perform these operations fast and carefully. The moving of the cultivation packages 8 is continued until the desired alternatingly distributed arrangements of cultivation packages 8-1 to 8-8 is obtained.

As follows from FIG. 2E, for example cultivation packages 8-1, 8-3, 8-5, and 8-7 may have been moved to the second rack 5, while cultivation packages 8-2, 8-4, 8-6, and 8-8 may reside in the first rack 4. As will be appreciated, to perform all required operations on each of the packages equally, the various cultivation packages may be moved back and forth between the first rack 4 and the second rack 5 in such a manner that eventually the alternatingly distributed arrangement of cultivation packages 8-1 to 8-8 is achieved (e.g. FIG. 2F).

Further, as may be appreciated, the moving of cultivation packages between the first rack 4 and the second rack 5 may be repeated at different moments during the growth process to perform such operations. The present invention particularly provides an advantage with respect to all these kinds of operations (including harvesting). With the arrangement and method of the present invention, the operators 15 can perform the required operations without having to move between the cultivation packages 8 while these reside in the racks. This provides optimal ergonomic working conditions and good visibility of the cultivation packages for performing the operations correctly and carefully.

Figure 2E:
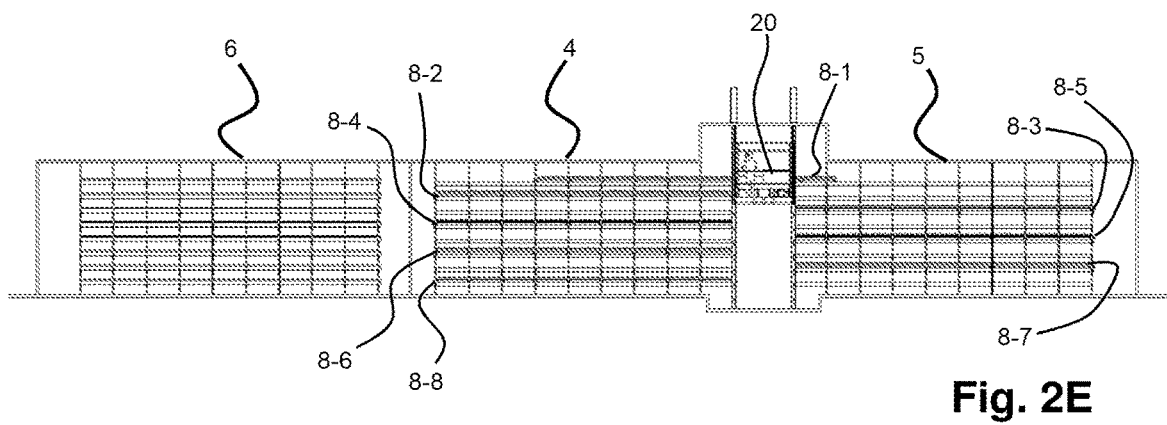
Figure 2F:
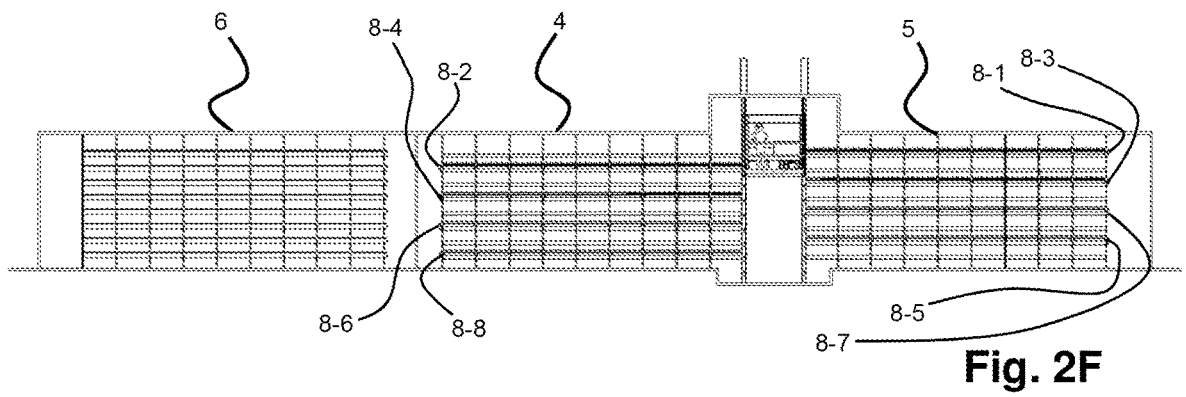

The eventual alternating distribution is illustrated in FIG. 2F. After each operation being performed, the packages from the second rack 5 may be moved to the first rack 4 and the packages from the first rack 4 may be moved to the second rack 5. Thus, after a next operation is performed on all of the cultivation packages, the stacking of the cultivation packages 8-1 to 8-8 and the distribution amongst the racks 4 and 5 may be in mirror image with respect to FIG. 2F.

The present embodiment comprise racks having a total of eight support heights, allowing eight cultivation packages (8-1 to 8-8) to be stacked in the racks. As may be understood, the invention is not limited to a particular number of cultivation packages or support heights. The skilled person may implement the invention having less or more stacked cultivation packages in the first and second rack, e.g. two or more without having a particular upper limit. The number of packages that may be stacked is at most limited by the dimensions of the space wherein the arrangement of the present invention is installed. Moreover, in the presently described embodiments, the height difference between each two subsequent support heights may be a couple of tens of centimeters (cm), e.g. 50 cm. In an alternatingly stacked distribution illustrated in FIG. 2F, the height above each cultivation package will therefore be double as much, i.e. approximately 100 cm. The height differences between the support heights may however be different than as suggested above. For example, the height difference could be any of 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, or even larger or smaller, or any distance in between these dimensions. The invention is not limited to a specific height.

Figure 3:
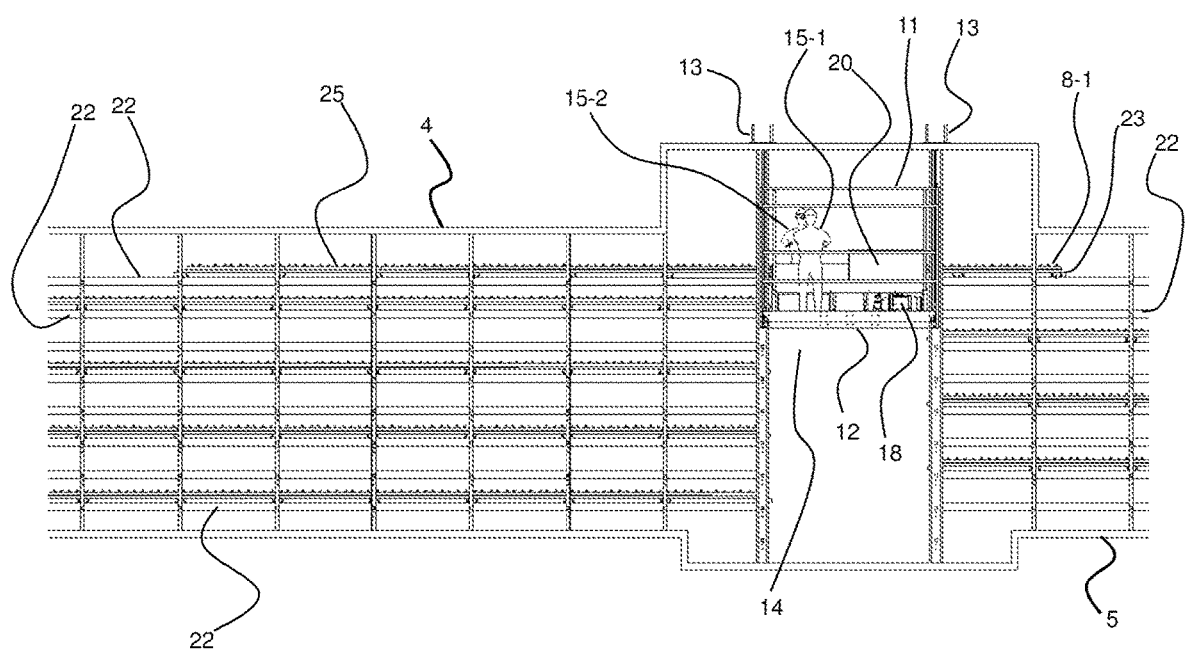
FIG. 3 illustrates a close-up of FIG. 2E, illustrating an operator platform.

FIG. 3 provides a close-up illustration of the operations platform 12 in FIG. 2E. As can be clearly seen in FIG. 3, the operations platform is moved to the top most support height and cultivation package 8-1 is hold from the first rack 4 towards the second rack 5. Operators 15-1 and 15-2 can work from both sides of the cultivation package, e.g. by providing a similar operator platform 12 on either side of the movable structure 11 with respect to the packages 8. The movable structure 11 comprises a suspension structure 20 onto which the above discussed tools and sensors may be mounted. Also visible in FIG. 3 is the moving means 18 that cooperate with the carriages 23 onto which the cultivation packages 8 are provided, for moving the cultivation packages 8 from one rack 4 to the other rack 5 and backwards. Additional driving means, including an engine and wheels cooperating with the rails 13, may be provided for providing the vertical movement of the operator platform and the moveable structure 11. FIG. 3 further shows the support structures 22 at the various heights in the first rack 4 and the second rack 5. The support structures 22 consists of guiding members, e.g. guiding rails 24, as will be shown in FIG. 4. In the packages 8 a plurality of horticultural products, e.g. mushrooms 25, are grown.

Turning to FIG. 4, the harvesting process in accordance with the present invention and using an arrangement of the present invention is illustrated. FIG. 4 shows a close up of the moveable structure 11 supporting the operator platform 12. Operators 15-1 and 15-2 are working on either side of the cultivation package. Cultivation package 8-4 is moved from the second rack 5 onto the first rack 4. By doing so, cultivation package 8-4 passes the working area 14 in between the first rack 4 and the second rack 5. The operators 15-1 and 15-2 select the mushrooms which are of the desired size for harvesting. The harvesting is performed manually and the harvested mushrooms are laid down in cradles 40 by each operator. A conveyer arrangement 33 is conveniently installed on a moveable structure 11 for removing the cradles 40 that have been filled during harvesting.

The movement speed of the cultivation package 8-4 may be controlled by setting the speed of the engine 18 using control buttons 30. The controls 30 may comprise additional buttons for setting the correct height of the operator platform 12 and other necessary controls (e.g. for operation of operator tools or sensors). The engine arrangement for moving the moveable structure 11 and for moving each of the cultivation packages is located inside the housing 32, not visible in FIG. 4. FIG. 4 further shows how each of the cultivation packages 8 is supported in carriages 23. The carriages 23 cooperate with rails 24 such as to form a drawer type of assembly. The rails 24 form the support structures 22 of the racks 4 and 5. By moving a carriage 23 out of one of the racks 4,5 across the working space 14, the carriage 23 engages with the rails 24 of the support structure 22 or the other rack 5,4 on the other side of the working space 14.

Figure 5:
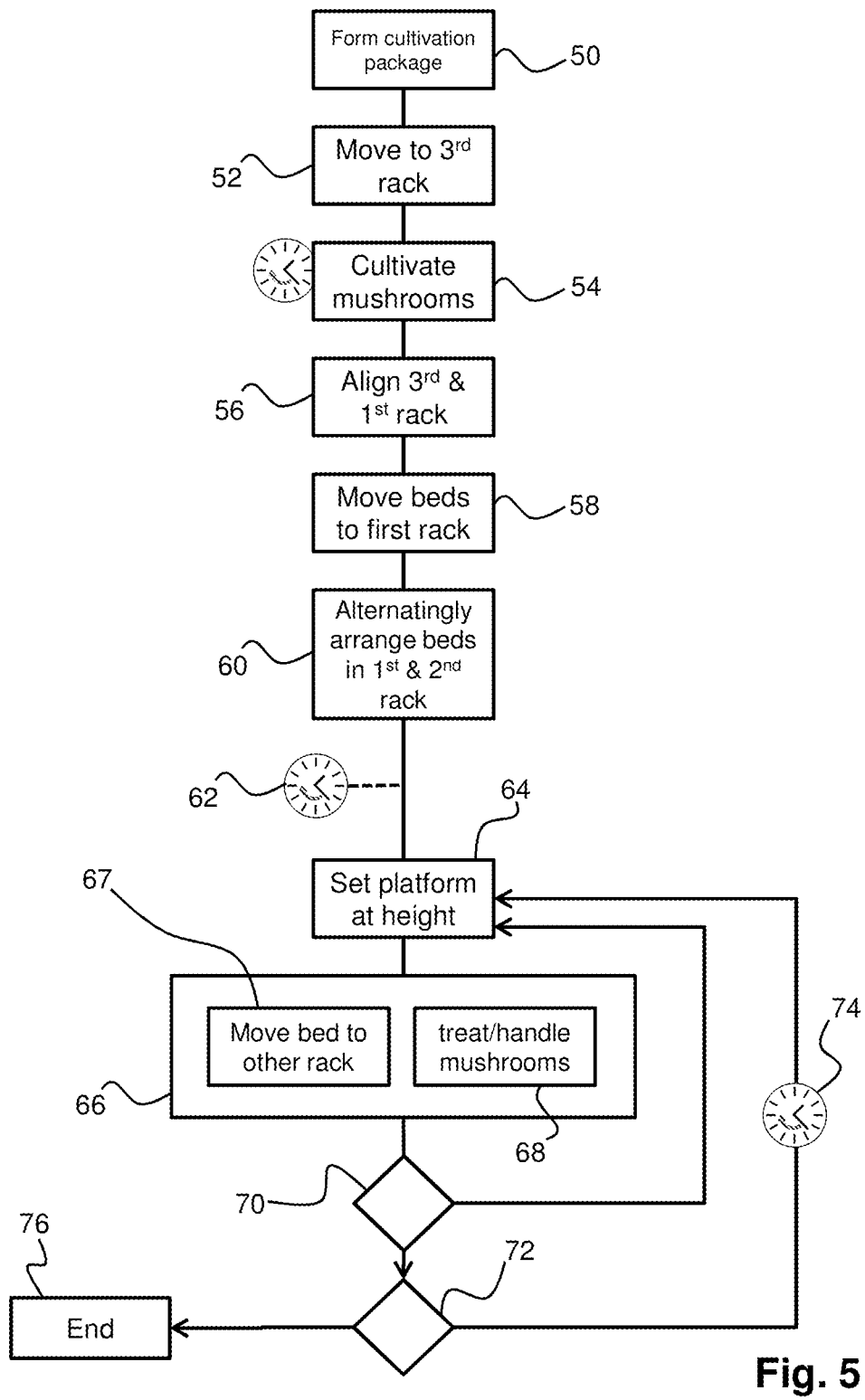
FIG. 5 illustrates a method of the present invention.

The method of the present invention is illustrated in FIG. 5. As will be appreciated, FIG. 5 shows an exemplary embodiment of the method. This is not the only possible embodiment of the invention, and a skilled person may, where desired, add additional steps, rearrange the order of the steps suggested, or even remove some of the suggested steps without departing from the present invention as defined in the claims. In FIG. 5, the method starts with the forming of the cultivation packages 8 in step 50, and movement of the cultivation packages to the third rack in step 52. Forming of the cultivation packages in step 50 may be performed in Various ways. For example, it is possible to perform spawning of mushrooms spores in compost to thereby form a package. Alternatively, compost with already spawned spores and ingrown mycelium may be distributed in a layer and may be optionally covered by casing soil for champignon cultivation. As a further alternative, preformed layer blocks of spawned and ingrown compost and optional casing soil may be laid down contiguously to form a cultivation package. The skilled person is able to recognize the various manners in which a cultivation package may be formed in step 50. During step 54, the mushrooms will stay for a while in the third rack during ingrowth of the mycelium into the packages and the forming of buttons at the surface and the growth of the mushrooms. Step 54 is the cultivation step and may take a number of weeks to complete, as illustrated by the schematic clock.

When the mushrooms are large enough for moving the cultivation packages to the first rack 4, the third rack 6 and the first rack 4 are aligned in step 56, and in step 58 the packages 8 are moved into the first rack 4. After all the cultivation packages have moved into the first rack, the cultivation packages 8 are distributed amongst the first and the second rack 4 and 5 in step 60, providing the alternatingly distributed stacking of the packages in the first and second rack. Operations may be performed on the packages 8 while moving these between the first and the second rack. The mushrooms may not be ready for harvesting yet, and some time (e.g. two or three weeks) may pass in step 62 for growing of the mushrooms to their desired size. In the meantime, where desired, the cultivation packages may be moved in between the first and the second rack 4, 5 back and forth for performing operation on the packages in the working space 14 of the arrangement. This is depending on the needs for the particular case. The moving of the cultivation packages between the racks is illustrated in step 64 and 66 (including sub-steps 67 and 68 and decision step 70). In step 64, the platform is set at a respective support height for moving one of the cultivation packages to the other rack. Next, in step 66 the respective cultivation package 8 is moved to the other rack, while at the same time performing treatment or handling of the mushrooms in step 68. In case this is any operation being performed prior to harvesting, the treatment may consist of fertilizing or wetting or any other kind of treatment of the mushrooms, but alternatively, during harvesting, step 68 may consist in harvesting the mushrooms which are of the desired size.

Step 68 may also be absent, in which case only the cultivation packages are moved to the other rack or backwards. This is found to be beneficial to the cultivation process as well, as will be explained. During cultivation, even though ventilation is provided for in the growing facility, the mushrooms have been found to benefit from a complete refreshing of the air directly ambient to the mushrooms. This may be achieved by simply operating the arrangement of the present invention by moving the cultivation packages to another rack or backwards, without requiring to perform any additional treatment step. So in case of such a refresh, it is not necessary to perform any handling or treating as is proposed in step 68.

Then, when the package has been moved to the other rack and the mushrooms have been treated or handled, in step 70 it is decided whether a next package has to be moved to the other rack, or whether all the packages have been treated or handled. Where a next package is to be moved to the other rack, the method continues again in step 64 by moving the operator platform to the next desired support height. Step 66 is then repeated for the further cultivation package. Alternatively, if all the cultivation packages 8 have been moved to the other rack, in step 70 it may be decided that treating or handling of the mushrooms in the cultivation packages is complete, and the method continues with decision step 72. In decision step 72, in case the cultivation method is completed and all (desired) mushrooms have been harvested and no new mushrooms will be taken from the packages, the method may end in step 76. The package is removed and the carriage 23 is cleaned. Even during this step, the arrangement of the present invention may provide an advantage. As will be appreciated, the suspension structure 20 of the arrangement 1 may comprise a cleaning nozzle and cleaning agents for cleaning the carriage 23 during this step. Alternatively in decision step 72, if harvesting has to be performed a further time on the same cultivation packages, the cultivation package 8 is left in tact for the desired duration of time (74) and the method returns back to step 64 at the moment that the cultivation packages are to be treated or harvested again. As will be appreciated, some of the steps described above may be modified, omitted or additional steps may be added to the method described hereinabove.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

REFERENCED METHOD STEPS OF FIG. 5

50 Form cultivation packages 8;
52 moving of cultivation packages 8 to $3^{rd}$ rack 6;
54 mushroom cultivation, first phase of process;
56 aligning of $3^{rd}$ & $1^{st}$ rack (where needed);
58 moving of packages 8 from $3^{rd}$ rack 6 to $1^{st}$ rack 4;
60 moving of packages 8 between $1^{st}$ and $2^{nd}$ rack 4, 5 until alternating distribution (e.g. FIG. 2f) achieved;
62 waiting period between steps (where needed);
64 move operation platform 12 to desired working height;
66 package handling/treating (incl. sub-steps 67 & 68);
67 move package to other rack through working area 14;
68 mushroom handling/treating/harvesting (depends on need)—this step may be absent if only refreshing of ambient air is desired;
70 decision step: move another package for treatment/handling?
72 decision step: cultivation method complete?
74 waiting period between steps (where needed);
76 end method, remove packages 8 and clean carriage 23 (e.g. using arrangement);

The invention claimed is:

1. Cultivation arrangement comprising a first and a second rack arranged adjacent and aligned with each other so as to provide a working space between the first and the second rack, wherein each rack comprises a plurality of support structures arranged at respective support heights for supporting cultivation packages at a plurality of heights in each rack, and such that the support heights of the first and the second rack are aligned with each other, wherein each support structure comprises one or more guiding members for guiding a cultivation package along a horizontal movement, the arrangement further comprises moving means arranged for cooperating with the cultivation packages, for transferring of the cultivation packages from the first to the second rack or from the second to the first rack via the working space;

wherein the arrangement is arranged for receiving or supporting a plurality of said cultivation packages, such that at most a single cultivation package is supported at each of the aligned support heights in the arrangement, for enabling the cultivation packages to be alternatingly supported in either the first or the second rack across the aligned support heights;

further comprising an operator platform arranged contiguous to the working space on at least one side thereof, the platform being moveable in a vertical direction to enable working by an operator at the support heights.

2. The cultivation arrangement according to claim 1, wherein each cultivation package is supported in a carriage cooperating with the one or more guiding members.

3. The cultivation arrangement according to claim 2, wherein the arrangement comprises a single carriage at each support height, which carriage is moveable between the first and the second rack.

4. The cultivation arrangement according to claim 2, wherein the moving means comprise an actuator comprising an engagement member arranged for engaging with one or more of the carriages, for moving of the carriage(s) by the actuator from the first to the second rack or from the second to the first rack.

5. The cultivation arrangement according to claim 4, wherein the actuator is mounted in the arrangement to be vertically moveable relative to the first and second rack so as to enable the engagement member, dependent on a current vertical position of the engagement member, to engage with the carriage(s) at a respective support height.

6. The cultivation arrangement according to claim 1, wherein the operator platform is connected to a moveable structure cooperating with vertical guiding members arranged on one or more of the first and second rack, for enabling vertical movement of the platform.

7. The cultivation arrangement according to claim 6, wherein the moveable structure comprises a first and a second operator platform being arranged on either side of the working space.

8. The cultivation arrangement according to claim 6, wherein the moveable structure further comprises, connected thereto, at least one of a group consisting of: a nurturing or wetting arrangement, a liquid nozzle, a powder nozzle, a granulate distributer, a sprayer, a drip irrigation device, or a fertilizer distributer; a harvesting apparatus; a selective eradicator, a needle or a gripper; a camera; a light source; and one or more sensors.

9. The cultivation arrangement according to claim 1, further comprising a third rack arranged adjacent and aligned with the first rack, the third rack comprising a plurality of further support structures arranged at respective support heights for supporting the plurality of cultivation packages at the plurality of heights in the third rack, and such that the support heights of the third rack are aligned with the support heights of the first rack, the arrangement further comprising a transfer unit for moving the plurality of cultivation packages from the third rack into the first rack.

10. The cultivation arrangement according to claim 9, wherein for providing the transfer unit, one or more of the plurality of support structures of the first rack each comprise a pulley comprising a windable longitudinal pulling member and a coupling member connected to the pulling member, the pulling member having a length for enabling spanning the first rack in longitudinal direction so as to enable coupling of the coupling member to one of the plurality of cultivation packages in the third rack, the pulley being operable for pulling said cultivation package into the plurality of support structures of the first rack.

11. The cultivation arrangement of claim 1, wherein the plurality of support structures is configured for supporting cultivation packages comprising horticultural products, wherein the horticultural products include at least one of a group consisting of: mushrooms; champignons; fruits; berries; nuts; vegetables; flowers; herbs; and spices.

12. Cultivation method using an arrangement comprising a first and a second rack arranged adjacent and aligned with each other, and each rack comprising a plurality of support structures for supporting cultivation packages at a plurality of support heights, the support heights provided by the first and second rack being aligned with each other at a same level, the method comprising:
  supporting a plurality of cultivation packages in the first and the second rack, such that at most a single cultivation package is supported in either the first or the second rack at each aligned support height, and such that the plurality of cultivation packages are alternatingly supported in either the first or the second rack across the aligned support heights;
  vertically moving an operator platform near a working space defined between the first and the second rack to enable an operator on the platform work at a selected support height;
  moving, using a moving means, a respective cultivation package from the first to second rack or from the second to the first rack at the selected height.

13. The cultivation method according to claim 12, further comprising treating or handling each cultivation package during said moving, wherein said treating or handling includes at least one of a group comprising: harvesting, verifying the cultivation, removing or eradicating damaged or diseased products, removing or eradicating products growing faster or maturing earlier than planned, monitoring cultivation conditions, nurturing or fertilizing.

14. The cultivation method according to claim 12, further comprising the steps of:
  cultivating, for a first duration of time, the plurality of cultivation packages in a third rack comprising a plurality of further support structures arranged at respective support heights, wherein the support heights of the third rack are aligned with the support heights of the first rack;
  aligning the third rack with the first rack; and
  moving, using a transfer unit, the plurality of cultivation packages from the third rack into the first rack, for enabling cultivation in either one of the first and the second rack for a second duration of time.

15. The cultivation method according to claim 14, wherein upon moving of the plurality of cultivation packages from the third rack into the first rack, at least one of the plurality of cultivation packages is moved by the moving means from the first to second rack, so as to establish the cultivation packages to be alternatingly supported in either the first or the second rack across the aligned support heights.

16. The cultivation method according to claim 14, wherein for forming the transfer unit, one or more of the plurality of support structures of the first rack each comprise a pulley comprising a windable longitudinal pulling member and a coupling member connected to the pulling member, the pulling member having a length for enabling spanning the first rack in longitudinal direction,
  the method comprising coupling of the coupling member to one of the plurality of cultivation packages in the third rack, and
  pulling, by operating the pulley, said cultivation package into one of the plurality of support structures of the first rack.

17. The cultivation method according to claim 14, wherein said moving the plurality of cultivation packages from the third rack into the first rack is performed by connecting the transfer unit to each of the cultivation packages, and hauling the cultivation packages into the first rack;
  wherein the hauling includes one or more of:
    hauling one or more carriages from the third rack into the first rack, wherein the carriages hauled from the third rack support the plurality of cultivation packages; or
    wherein the packages in the third rack are supported on a cloth or canvas or on a plate-like construction, and wherein for hauling the plurality of cultivation packages are pulled into a carriage located in the first rack; or
    hauling each of the plurality of cultivation packages into the first rack one-by-one; or hauling two or more cultivation packages into the first rack together; or hauling the plurality of cultivation packages into the first rack all at once.

18. The cultivation method of claim 12 for cultivating horticultural products, wherein the horticultural products include at least one of a group comprising: mushrooms; champignons; fruits; berries; nuts; vegetables; flowers; herbs; and spices.

* * * * *